No. 802,031. PATENTED OCT. 17, 1905.
G. W. ESCHENBACH.
ADVERTISING DEVICE.
APPLICATION FILED APR. 29, 1904.

3 SHEETS—SHEET 2.

Witnesses:
Gustavus W. Eschenbach,
Inventor,
by
Attorneys.

No. 802,031. PATENTED OCT. 17, 1905.
G. W. ESCHENBACH.
ADVERTISING DEVICE.
APPLICATION FILED APR. 29, 1904.
3 SHEETS—SHEET 3.
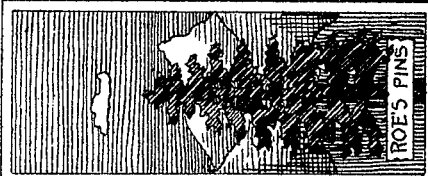
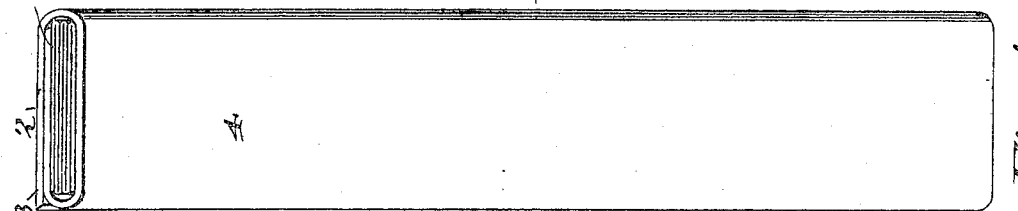
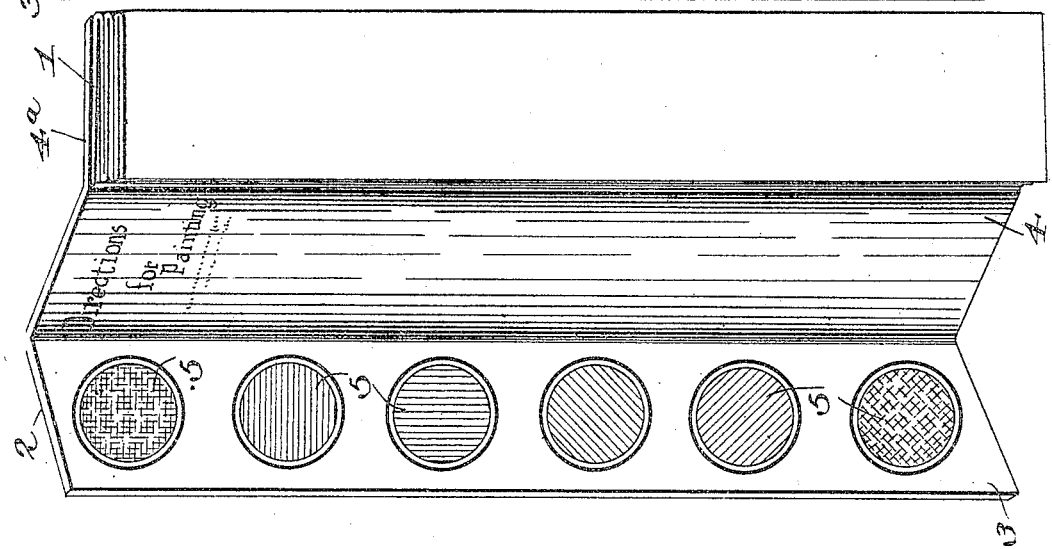
Witnesses
E. W. Stewart
R. M. Elliott
Gustavus W. Eschenbach,
Inventor.
by C. A. Snow & Co.
Attorneys

UNITED STATES PATENT OFFICE.

GUSTAVUS WILLIAM ESCHENBACH, OF EASTON, PENNSYLVANIA.

ADVERTISING DEVICE.

No. 802,031. Specification of Letters Patent. Patented Oct. 17, 1905.

Application filed April 29, 1904. Serial No. 205,601.

*To all whom it may concern:*

Be it known that I, GUSTAVUS WILLIAM ESCHENBACH, a citizen of the United States, residing at Easton, in the county of Northampton and State of Pennsylvania, have invented a new and useful Advertising Device, of which the following is a specification.

This invention is a book, and has for its object to provide the same with certain educational and advertising characteristics, the educational feature serving to cause the recipient of the book to preserve the same for its educational value, whereby the advertising matter is also preserved instead of being destroyed or thrown away, as is usually the lot of ordinary advertising instruments.

The educational feature of the invention includes a series of pictures appropriately colored and a series of duplicates thereof in outline, the colored pictures serving as guides or examples for the coloring of the outline pictures. The book is of course provided with a series of paints for use in coloring the outline pictures. It is also proposed to form the book in the nature of a folder and to have the series of pictures constitute a complete or continuous picture when the folder is open, each picture being arranged so as to mate with any of the other pictures, and thereby produce a new composite picture by folding the folder on its various folds.

In the manufacture of the book each picture will be formed by a separate plate, and as the pictures are formed to mate with one another the printing-plates may be arranged in any desired order, whereby a great variety of composite pictures may be produced according to the directions of the different purchasers.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
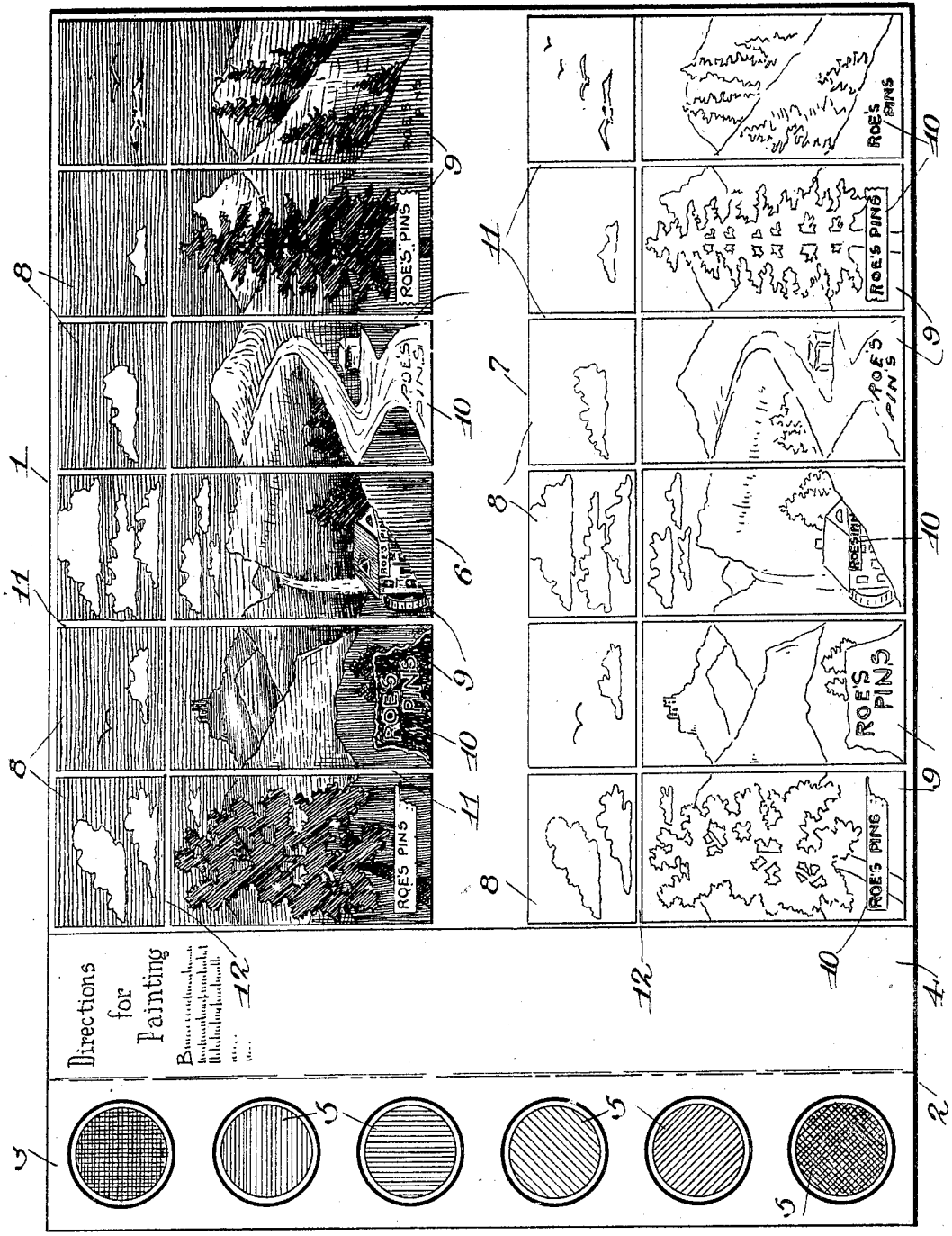
Figure 2:
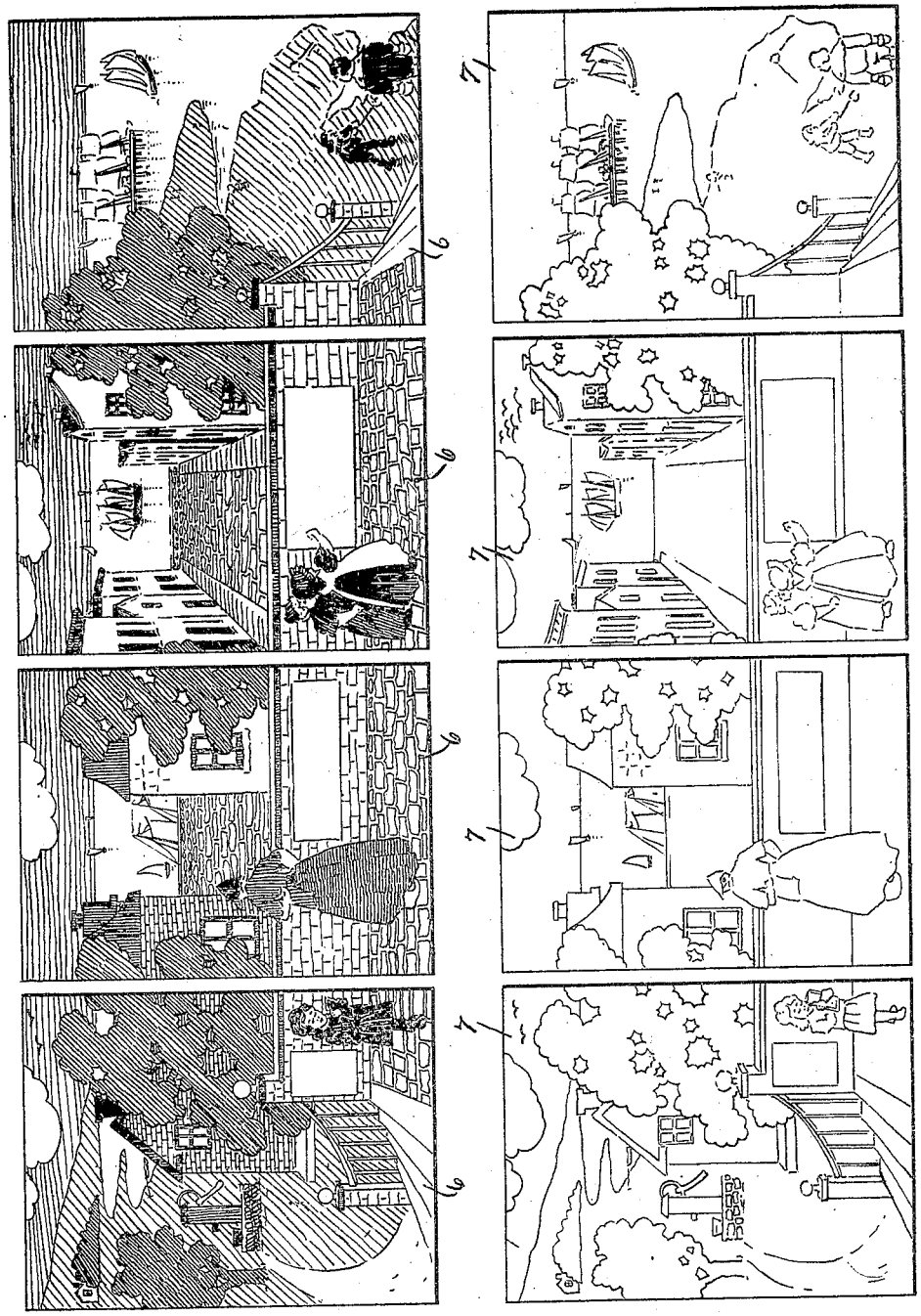

In the drawings, Figure 1 is a view in elevation of the book in its open condition. Fig. 2 is a similar view, the back being omitted, showing pictures of another character. Fig. 3 is a perspective view of the book folded with the back or cover open. Fig. 4 is a perspective view of the book folded or closed in condition for distribution. Fig. 5 is a detail view of a modified picture arrangement.

Like characters of reference designate corresponding parts in each and every figure of the drawings.

In carrying out the present invention I employ a sheet 1 of paper or other material capable of being folded to produce what is commonly known as a "folder," the lines of the folds being designated 11, thereby producing a series of connected pages, each page being provided in its upper half with a color picture 6 and in its lower half with a duplicate outline picture 7, whereby when the folder is open there is presented a series of color pictures and a series of outline pictures, the two series being separated by a blank space. It will be noted that each picture is complete in itself, while at the same time adjacent pictures mate or merge into one another, so as to form a composite picture, whereby the entire series of pictures coöperate to present a single composite or panoramic view. In order that one picture may be accurately mated or merged into the next adjacent picture, each picture is divided into an upper or sky-line section 8 and a lower or ground section 9, it being designed to have all of the sky portion of each picture contained in the upper section and the back and foreground portions of the picture in the lower section, the back and foreground portions of the several pictures being so proportioned that they will accurately mate or merge into the back and foreground portions of any of the other pictures when their edges are brought into alinement. In other words, the scene or view may be changed by partially folding the sheet so as to cover up one or more of the pictures, and thereby bring one or more of the exposed pictures into alinement with another picture. By folding the sheet into the various relations of which it is capable a great number of changes in the composite picture may be produced, thereby affording considerable amusement or entertainment to the party manipulating the sheet.

For the purpose of protecting the folder there is a cover or back (designated in general 2) and including an intermediate section 4 and end sections 3 and 4ª, the section 4ª being pasted or otherwise secured to the back of what will be termed the "inner terminal section" of the folder, as clearly shown in Fig. 3 of the drawings. The back is of course foldable along the lines of division between the intermediate and end back sections, whereby the back is capable of being folded around the folder, as shown in Fig. 4, so as to entirely envelop the folder and protect the same when in condition for distribution.

As hereinbefore indicated, the colored pictures 6 are intended to serve as guides for coloring the outline pictures 7, and therefore it is proposed to equip the book with a series of colors or paints 5 in the nature of disks or blocks secured to the inner face of the free end section of the cover or back, whereby the paints are housed and protected in the closed condition of the book and are exposed for access when the book or folder is open. This is a very important feature of the invention, as the paints are permanently carried by the book and are therefore always in position for convenient access whenever it is desired to color the outline pictures 7.

The advertising feature of the invention is embodied in a panel or blank space (designated 10) on each picture, said space being designed to contain any suitable advertising matter. In practice the plates from which the pictures are printed are provided with openings, so as to produce the panels or blank spaces, the advertising matter being printed upon the blank spaces after the printing of the pictures, or the type may be set up in the openings of the plates, so as to print the advertising matter simultaneously with the printing of the pictures.

From the foregoing description it will be understood that the feature of coloring the outline pictures and also the feature of adjusting the folder so as to bring the pictures into different relations, and thereby produce changes in the panoramic view or composite picture, will lead to the preservation of the book as well as constituting an educational feature, and this preservation of the book of course results in the preservation of the advertising matter, which is always displayed when the book or folder is open.

As an additional advertising feature it is proposed to offer prizes or other inducements for comparative degrees of excellence in the coloring of the outline pictures, the directions for coloring the pictures and the conditions of the contest being printed upon the inner face of the intermediate back section 4, wherefore these instructions are clearly exposed to view when the folder or book is open, and thereby add to the advertising feature of the invention.

While the present device is primarily designed as an advertising medium or instrument, it is of course apparent that the advertising matter may be omitted and the book or folder sold over a counter by mail or otherwise for its intrinsic value as a toy book or as an educational device.

In the embodiment shown in Fig. 1 it will be understood that the sky-section 8 of each picture is printed by a plate separate from the ground-section 9, and therefore the sky-sections may be interchanged with the ground-sections so as to provide other changes in the pictures. However, it is also proposed to have the ground and sky sections included upon a single plate, as embodied in Figs. 2 and 5 of the drawings, either of which arrangements may be employed, according to the conditions of the different orders for the books.

When a picture is printed from two plates, as in Fig. 1 of the drawings, there will of course be a narrow blank space 12 between the sky-section and foreground-section of the picture; but this space is not sufficient to make an objectionable break in the picture.

Having fully described the invention, what is claimed is—

1. A folder having a series of colored pictures and outline duplicates thereof, there being a colored picture and a duplicate thereof on each section of the folder, each series of pictures constituting a panoramic view when the folder is open, and each picture in each series capable of mating with any of the other pictures of the same series when folded to bring their edges into alinement, a folded cover secured to one edge of the folder and of a size to embrace the folder when the latter is closed, and paints secured to the inner face of the cover.

2. A folder having a series of colored pictures and outline duplicates thereof, there being a colored picture and a duplicate on each section of the folder, each series of pictures constituting a panoramic view when the folder is open, and each picture in each series capable of mating with any of the other pictures when folded to bring their edges into alinement, a folded cover secured to one edge of the folder and of a size to embrace the folder when the latter is closed, the inner face of one portion of the cover being provided with directions for painting the outline pictures, and paints secured to the inner face of another portion of the cover.

In testimony that I claim the foregoing as my own I have hereto affixed my signature in the presence of two witnesses.

GUSTAVUS WILLIAM ESCHENBACH.

Witnesses:
  CHAS. B. BRUNNER,
  JOHN BRUNNER.